United States Patent [19]

Anderson et al.

[11] Patent Number: 5,170,700

[45] Date of Patent: Dec. 15, 1992

[54] FLUTED COLUMN FOR JUICE EXTRACTOR

[75] Inventors: David N. Anderson; Wayne C. Sherman, both of Lakeland, Fla.

[73] Assignee: FMC Corporation, Chicago, Ill.

[21] Appl. No.: 627,788

[22] Filed: Dec. 14, 1990

[51] Int. Cl.⁵ .............................. A23N 1/02; B30B 9/02
[52] U.S. Cl. ......................................... 99/510; 99/509; 100/98 R; 100/108; 100/213
[58] Field of Search ................. 99/495, 496, 509, 510, 99/513; 100/98 R, 108, 117, 213, 145

[56] References Cited

U.S. PATENT DOCUMENTS

| | | | |
|---|---|---|---|
| 797,374 | 8/1905 | Roberts | 100/117 |
| 2,419,545 | 4/1947 | Gray et al. | 100/117 |
| 2,573,585 | 10/1951 | McBean | 100/117 |
| 2,579,032 | 12/1951 | Comotto | 100/108 |
| 3,236,175 | 2/1966 | Belk | 100/108 |
| 3,736,865 | 6/1973 | Hait | 99/513 |
| 4,300,449 | 11/1981 | Segredo | 100/108 |
| 4,376,409 | 3/1983 | Belk | 99/509 |
| 4,393,760 | 7/1983 | Hasegawa | 99/510 |
| 4,700,620 | 10/1987 | Cross | 99/510 |
| 4,905,586 | 3/1990 | Anderson et al. | 99/509 |

Primary Examiner—Timothy F. Simone
Attorney, Agent, or Firm—Douglas W. Rudy; Richard B. Megley

[57] ABSTRACT

In juice extractor apparatus there is usually provided an orifice tube inside a strainer tube. The orifice tube would have a central aperture through its length for the transport of fruit pulp. The orifice tube of conventional structure is replaced by a fluted column that allows transport of the fruit pulp on the outside of the fluted column and inside the strainer tube.

9 Claims, 2 Drawing Sheets

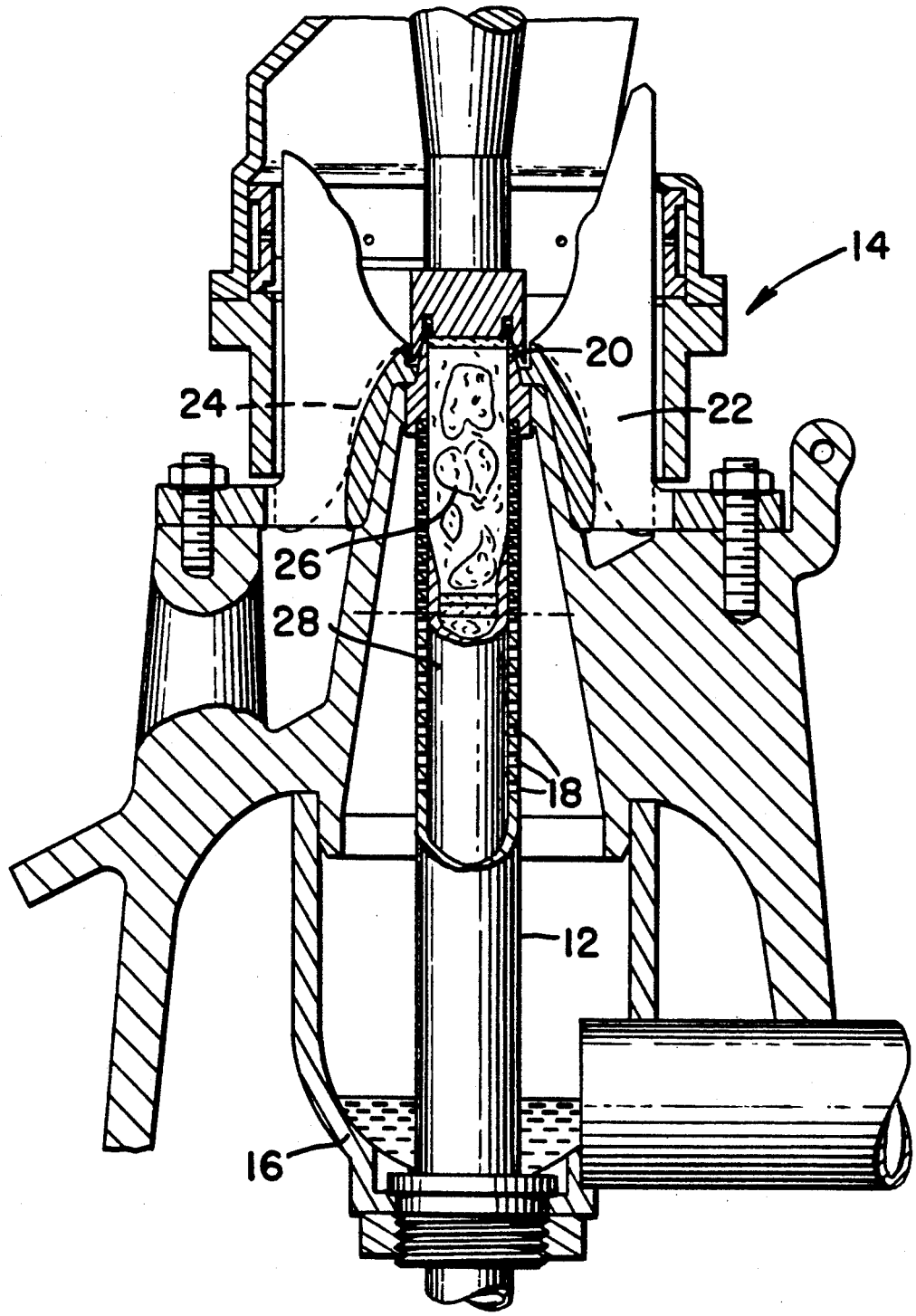
FIG_1
PRIOR ART

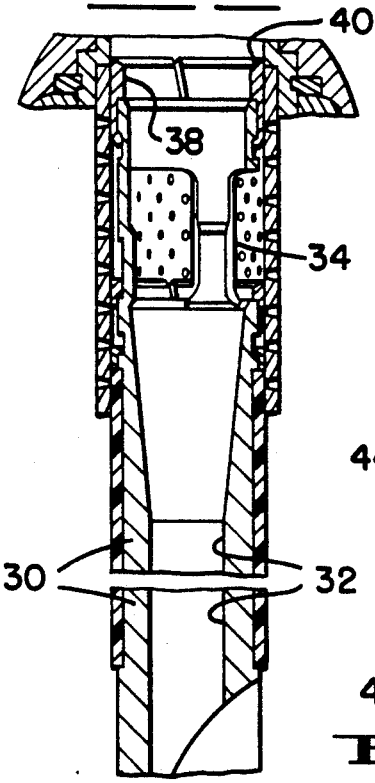
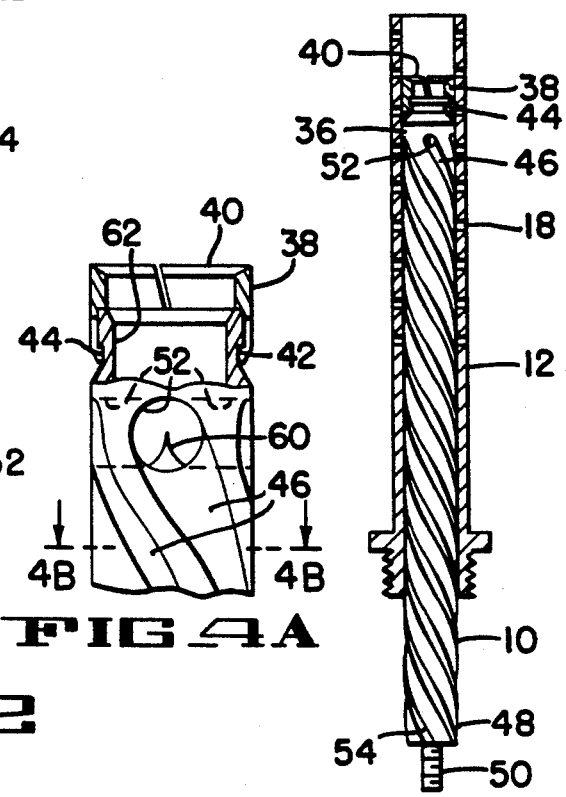
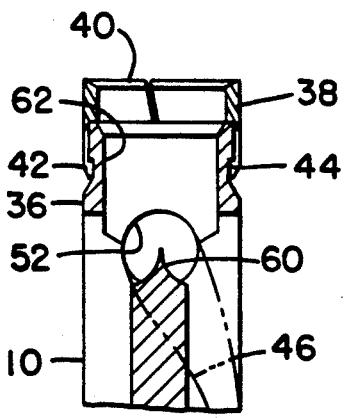
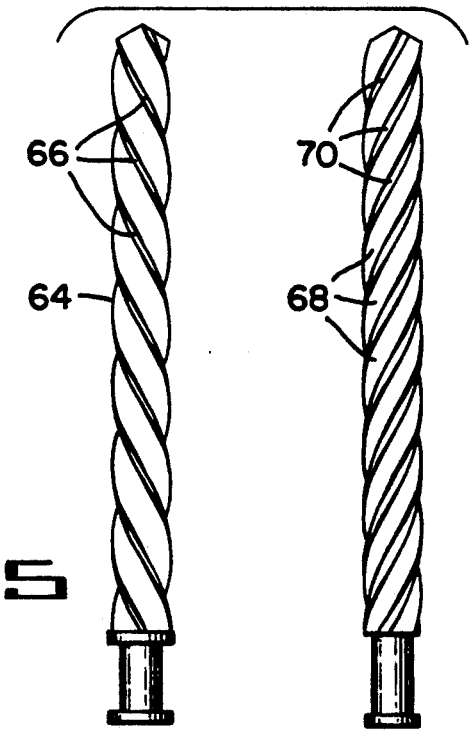
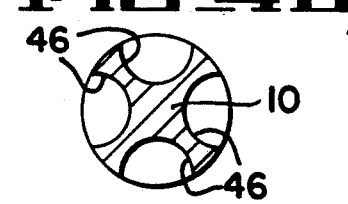

FLUTED COLUMN FOR JUICE EXTRACTOR

BACKGROUND OF THE INVENTION

This invention has to do with juice extraction equipment of the type including a strainer tube through which fruit pulp is transported during the juicing cycle of the extraction operation. Persons having ordinary skill in the art will recognize this invention as pertaining to the type of juice extractors disclosed in U.S. Pat. Nos. 2,649,730 to Hait; 3,236,175 to Belk; 4,300,449 to Segredo as well as others. In this type of juice extractor oranges are placed one-by-one between two opposed cups that move toward each other to squeeze the fruit, rupture the skin and direct juice, seeds, pulp and disc-shaped pieces of peel downwardly through a perforated cylindrical finishing tube. As the juice and other material moves downwardly, a plunger moves upwardly to receive the peel segments, seeds and pulp in a central axial passage in the plunger and to force juice laterally through the perforations of the tube into a collection chamber.

More specifically the invention herein entails the use of a fluted column inside the strainer tube of a juice extractor. The fluted column allows the passage of fruit pulp along and through the flutes of the column adjacent to the interior surface of the screen of the strainer tube.

Well known embodiments of juice extractors have an orifice tube carried inside the strainer tube. The orifice tube has an internal longitudinal orifice through which fruit pulp is transported after most of or at least a significant quantity of juice is extracted from the fruit being processed.

The operation of the orifice tube is well known and has been described along with the operation of a conventional juice extractor in several U.S. patents. This invention is very different from those early embodiments however in that the orifice tube is replaced by the fluted column. This is the most significant difference between this invention and the prior art juice extractors.

As mentioned above the present well known juice extractors use an orifice tube. This orifice tube is a tubular structure with an internal longitudinal orifice, or hole. The orifice can be made of varying size to impose different degrees of restriction on the fruit pulp passing through the orifice tube. It is believed that the orifice tube structure works quite well as peel and core material from the fruit are quickly separated from the juice thus yielding a high quality product.

A variant of the prior art orifice tube is the incorporation of a window tube in the top portion of the standard orifice tube. The use of the window tube improves yield—that is the amount of liguid recovered from the fruit—but increases bottom pulp and oil content of the juice. This increase in yield is at the expense of higher oil and bottom pulp may be desirable for certain juice products but is generally not the primary goal of juice extraction.

The primary goal, stated very simplistically, is to optimize yield and minimize the oil content of the juice being extracted from a particular fruit.

The fluted column apparatus disclosed herein has the benefit over the prior art of increasing yield over standard components (a standard orifice tube) and at the same time not increasing the bottom pulp or oil content when compared with an orifice tube having the accessory window tube.

SUMMARY OF THE INVENTION

In a juice extractor, of the type incorporating a strainer tube, a fluted column is fitted into the strainer tube and mounted for longitudinal reciprocal motion in the strainer tube.

The fluted column may have a single or a plurality of spiral grooves machined or otherwise formed in the surface of the column. The spiral grooves may extend the entire length of the fluted column or ma be of various lengths and/or various positions along the fluted column. That is, the relative upper end of the column could begin with spiral grooves which would extend part way down the column. At some intermediate location on the column the spiral grooves could then connect with or meld into straight grooves or grooves of a different pitch. Many combinations are possible.

In a preferred embodiment it has been determined that the inclusion of a split ring cutter at the top of the fluted column provides performance enhancements over a fluted column not so equipped. The split ring cutter will scrape the inner surface of the, strainer tube as the fluted column is cycled upwardly and downwardly through the strainer tube. At least one orifice allows pulp to pass from the interior of the split ring cutter to the fluted section of the fluted column. In the preferred embodiment one orifice is provided to each groove and there are four grooves cut in the fluted tube.

BRIEF DESCRIPTION OF THE DRAWING FIGURES

The invention will be understood from a reading of this specification in combination with a perusal of the drawing figures wherein:

FIG. 1 is a portion of a prior art juice extractor with some parts broken away and sectioned for clarity;

FIG. 2 is a portion of a prior art juice extractor showing an orifice tube with window attachment, shown with some parts broken away and sectioned;

FIG. 3 is a cross sectioned and simplified representation of a strainer tube and the fluted column of the instant invention:

FIG. 4 is a broken away and sectioned portion of the preferred invention;

FIG. 4A is a broken away and sectioned portion of the preferred invention showing multiple spiral grooves;

FIG. 4B is a cross section taken through plane 4B—4B of FIG. 4A;

FIG. 5 presents several different embodiments of the fluted column shown in FIG. 3.

DETAILED DESCRIPTION OF THE INVENTION

The fluted column 10 can best be comprehended by looking at FIG. 3 wherein the fluted column is shown in position in a strainer tube 12. The fluted column will be described in more detail further on however it should be clear what the critical element of the invention looks like.

Turning now to FIG. 1 there can be seen a relatively simplistic presentation of the squeezing zone of a two cup interdigitating finger fruit cup juice extractor. This prior art device is well known in the prior art and is shown here only to show the environment for the fluted column 10 and the strainer tube 12 shown in FIG. 3. In general, the juice extractor 14 comprises a whole fruit squeezing mechanism and cooperating juice separating apparatus. The fruit squeezing mechanism comprises a pair of digitated, upper 22 and lower cups 24, each of which is provided with a plurality of spaced blades or fingers. The upper cup 24 is secured, in a downwardly opening orientation, to a vertically reciprocal head which also carried a cutter assembly that has a downwardly directed circular blade. The cylindrical finishing tube or strainer tube 12, forms a part of the juice separating apparatus and has a multiplicity of small perforations 18 provided in the upper portion of its wall. The cylindrical finishing tube 12, in the prior art slidably receives a pressure exerting member in the form of an elongated plunger or orifice tube 28 that is fastened in an upwardly extending position to means operatively connected with the upper cup support means for vertical reciprocation in times relation therewith in a manner fully disclosed in the above mentioned Belk, et al U.S. Pat. No. 2,780,988.

The device generally 14 includes a strainer tube 12 which is threaded into the bottom of a juice manifold 16. The strainer tube is provided with a plurality of holes such as 18 in at least the upper portion of the strainer tube as shown in the Figure. The strainer tube terminates in a circular knife 20 which is positioned to cut a plug in the fruit being squeezed and allow passage of the pulp of the fruit into the strainer tube 12, pulp and two plugs of orange peel from each fruit make it into the interior of the strainer tube. Most of the peel is removed from the fruit by means of interdigitating fingers making up cups such as 22 and 24. Most of the juice from the fruit is drained directly into the juice manifold 16.

The pulp that passes into the strainer tube 12 does contain some juice and it is desirable to squeeze this collected pulp, shown as 26, to remove as much of the usable juice as possible from the pulp. In order to squeeze this pulp an orifice tube 28 is cycled up through the interior of the strainer tube 12 and, due to the constricted internal diameter of the standard orifice tube the pulp is compressed. As it is compressed the juice from the pulp is forced out through the apertures of such as 18 of the strainer tube 12.

Conventional orifice tubes, such as that shown in FIG. 2 as 30, may have a reduced internal diameter section 32 to aid in restricting the pulp passing through the tube. Also the orifice tube embodiment shown in FIG. 2 includes a window tube portion 34 that assists in some instances of increasing the yield of the juice extractor as juice can migrate from the inside of the orifice tube to the strainer tube.

Both FIGS. 1 and 2 are embodiments that are known in the prior art and are shown to show the environment of the invention. The invention is clearly shown in FIGS. 3 through 5.

Turning again to FIG. 3 wherein the fluted column 10 is shown inserted into the strainer tube 12 its actual configuration can be described. The first end 36 of the fluted column is shown having a split ring cutting element 38 connected to the end of the column. The split ring has a knife edge at 40 which fits tightly against the interior of the strainer tube 12 and seems to cut off any pulp product that gets caught in the holes 18 of the strainer tube as the fluted column is cycled up and down through the strainer tube.

The split ring cutting element 38, sectioned in the Figures, has a tab 42 which fits into a ledge equipped recess 44 at the first end of the fluted column.

A first spiral groove 46 of FIG. 3 extends from the first end of the fluted column to the second end 48 of the fluted column. A means for mounting the fluted column, in this case a threaded rod 50, is carried at the second end of the fluted column. Alternative means for mounting the fluted column to the juice extractor are contemplated and virtually any secure attachment means could be used.

In FIG. 3 the first spiral groove 46 terminates in an aperture 52 which connects the spiral groove 46 to an orifice in the interior of the top portion of the fluted column. This interior orifice or passage extends through the split ring cutting element 38 and through the upper portion or first end of the fluted column so that pulp in the strainer tube 12 can pass through the interior of the split ring cutter, through the interior passage in the first end of the fluted column, through the aperture 52 and into the spiral groove 46. Once the pulp is in the spiral groove it will travel down the length of the fluted column, which is a close fit in the strainer tube, all the while being compressed and thereby causing juice remaining in the pulp to be forced out through the holes 18 in the strainer tube. Ultimately the now relatively dry pulp can exit the spiral groove at the second or lower end 54 of the fluted column.

In the FIG. 3 embodiment multiple spiral grooves are provided, as well as multiple apertures 52. Details of the upper end area of the fluted column of FIG. 3 are shown in FIGS. 4A and 4B. In these two views it is clear that more than one spiral groove has been formed in the column. Items 52 and 46 are similar formed elements on the column—apertures and spiral grooves respectively.

A detail of the embodiment of FIG. 3 is shown in FIG. 4. This view shows only a single spiral groove 46 and a single aperture 52 however the other spiral grooves and apertures that are part of the FIG. 3 embodiment have been left off FIG. 4 for purposes of clarity. This figure is provided to show that the aperture 52 may be cut into the interior of the fluted column using a ball mill or similar tool and if only drilled to a given depth, on the order of the length of the radius of the outside diameter of the column in a preferred embodiment, a projection or quadricator 60 will remain in the interior of the fluted column. This is if a bore 62 has been formed in the first end of the fluted column and if the ball mill cuts similar apertures into the column of the upper ends of the four spiral grooves.

It has been determined that forming such a quadricator 60 in the interior of the fluted column aids in separating the pulp being forced into the passage on the interior of the fluted column into four roughly equal streams of pulp for passage into the spiral grooves. Of course, if 2, 3 or 5, etc. spiral grooves were formed in the column then it is expected that there would be 2, 3 or 5, etc. apertures such as 52 and the quadricator wouldn't have the four surfaced pyramid shape as it would have if four holes were milled.

Alternatively it is contemplated that the quadricator is not used at all in the passage from the first end of the fluted column to the spiral grooves.

FIG. 5 presents two other embodiments of the invention. The fluted column 64 has wide spiral grooves with only a small land 66 between each groove. The first end of this fluted column is also different from a preferred embodiment. Here there is no split ring cutter element used—nor is the column bored at the first end thereof. In this embodiment no split ring cutting element is used because the material passing into the strainer tube 12 is cut only by a circular knife such as 20 in FIG. 1. The material in the strainer tube 12 passes directly to the spiral grooves such as 68 without having to first pass through a split ring cutter element, out the apertures, through the interior of the fluted column and to the spiral grooves. In practice this alternative embodiment of fluted columns (FIG. 5) would be a replacement for the fluted column embodiments shown in FIG. 3 and 4.

The second embodiment shown in FIG. 5 is also different. It has spiral grooves such as 68 and slightly wider lands 70. The spiral grooves are also cut as relatively right hand spirals while the other alternative embodiment and FIG. 3 have spiral grooves cut as left hand spirals.

Another series of embodiments are also contemplated by the inventor but not shown. In these alternative embodiments the flutes don't necessarily extend from the first end to the second end of the fluted column. The spiral grooves could start at the first end and extend only part way down the column where they could become less spiral or even straight cut grooves. Or the grooves could start out straight and transit into spiral grooves. Or for that matter any combination of grooves could be used. The invention is more directed to having a passage extending along the outside of the column so that pulp is squeezed between the column and the strainer tube. The passage can extend on the outside of the column for its entire length as shown in the FIG. 5 embodiments or it can be inside the column for a portion of its length as in the preferred embodiment shown by FIG. 3.

Thus it can be seen that there has been provided an improved juice extractor utilizing a fluted column that accomplishes the object of this invention. A preferred embodiment of the invention has been presented as have several different embodiments of the invention. Other embodiments are contemplated by the inventor and the following claims attempt to broadly claim the invention including nuances of design and equivalents that are within the scope of the following claims.

What is claimed is:

1. In a juice extractor having means for providing reciprocal motion and having a strainer tube, the improvement comprising: a fluted column mounted for longitudinal reciprocal motion in said strainer tube, said fluted column having an interior and having an outside surface, a first end and a second end and at least a single passage extending from said first end to said second end, said passage formed on said outside surface of said fluted column for at least a portion of the length of the passage.

2. The invention in accordance with claim 1 wherein said passage is a spiral groove for at least a portion of the length of said passage.

3. The invention in accordance with claim 2 wherein said passage passes from said interior of said fluted column to said passage formed on said outside surface of said fluted column.

4. The invention in accordance with claim 2 wherein said passage is a spiral groove extending from said first end of said fluted column to said second end of said fluted column.

5. The invention in accordance with claim 4 wherein a plurality of spiral grooves extend from said first end of said fluted column to said second end of said fluted column.

6. The invention in accordance with claim 5 wherein said plurality of spiral grooves are greater than two in number.

7. The invention in accordance with claim 6 wherein said plurality of spiral grooves are less than ten in number.

8. The invention in accordance with claim 2 wherein said passage is a spiral groove for at least a portion of the length of said passage and is a non-spiral groove for another portion of the length of the passage.

9. The invention in accordance with claim 3 wherein said passage is surrounded by a split ring cutter element in the vicinity of where said passage is in said interior of said fluted column.

* * * * *